Jan. 3, 1950   G. HERZOG   2,493,535
VOLTAGE CONTROL AND STABILIZING CIRCUITS
Filed March 17, 1945
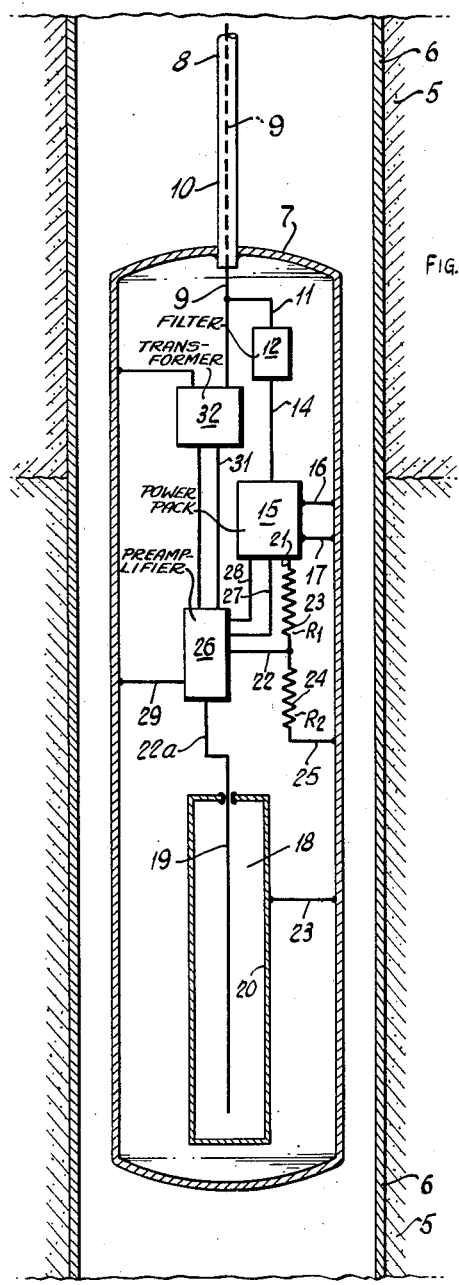
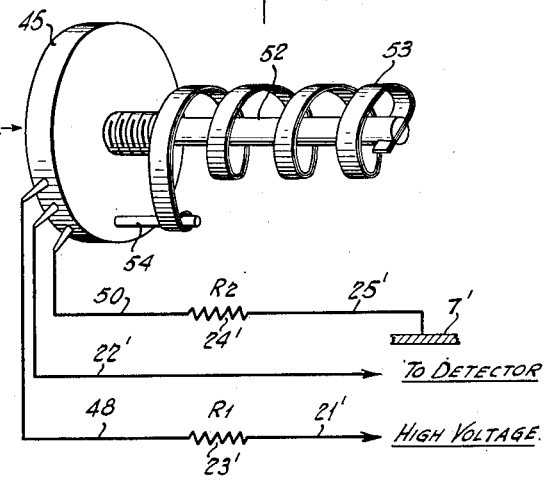
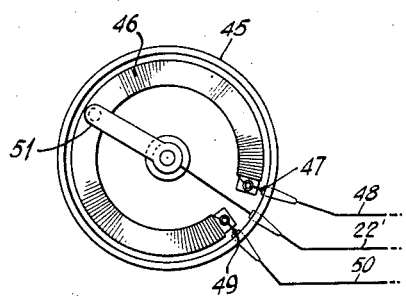
INVENTOR.
GERHARD HERZOG.
BY
ATTORNEY.

Patented Jan. 3, 1950

2,493,535

UNITED STATES PATENT OFFICE 2,493,535

VOLTAGE CONTROL AND STABILIZING CIRCUITS

Gerhard Herzog, Houston, Tex., assignor to The Texas Company, New York, N. Y., a corporation of Delaware Application March 17, 1945, Serial No. 583,315

4 Claims. (Cl. 250—83.6)

The present invention relates to improvements in connection with means for the investigation of the intensity of radiations and more particularly of the nature and properties of formations, such as those surrounding a bore or well, as oil wells and bore-holes, and more particularly for the investigation of radioactive properties of these formations, either natural or as modified or influenced by the application of various types of radiation thereto.

In radioactivity well-logging, it has heretofore been proposed to employ for the exploration of the oil wells or bore-holes, instruments containing radiation detectors of various types, such as ionization chambers, in which a continuous current is derived from the detector, the amount of the current varying as a function of the intensity of the radiations from the formations encountered by the instrument; and also to use detectors of the pulse-producing or counter type, from which, instead of continuous currents, current pulses are derived, the frequency of which is a function of the intensity of the radiation from the formations traversed by the instrument. In the use of detectors of the counter type, depending upon specific details of construction and conditions of operation, the size or amplitude of the pulses may be approximately proportional to the initial ionization produced as a result of the radiations from the formations, in which case the detector is designated a proportional counter; or it may be substantially independent of such initial ionization, in which case it may be designated as a non-proportional counter. The well-known Geiger-Müller counter is a detector of the latter type, as are also the high efficiency counters or detectors disclosed in the U. S. Letters Patent of myself and another, No. 2,397,073 granted March 19, 1946 and in the U. S. Letters Patent of Donald G. C. Hare, No. 2,397,071 granted March 19, 1946.

As is well-known, considerable variations in temperature are found in oil wells or bore-holes, particularly in the case of deeper wells, which may extend to depths of two to three miles, or even somewhat deeper. Temperatures as high as 200° to 240° F. may be encountered. In radioactivity well-logging with devices using the ionization chamber or continuous current output type of radiation detector, it has been found impractical to log wells in which higher temperatures, say above about 170° F., are encountered, as such devices apparently become ineffective and inaccurate under such conditions.

It has now been found that radioactivity logging of wells, even at the highest temperatures which have been encountered, may be satisfactorily accomplished, employing radiation detectors of the counter type. As is known, such counters, for non-proportional operation, have imposed upon them a relatively high direct current voltage and there is a limited range of voltages, known as the operating plateau, in which the radiation results in pulses which are practically independent of the amount of initial ionization. The voltage for operation of the counter is selected from within this plateau.

It has been found that the proper voltage for operation of such counters varies with the temperature of the counter, increasing with increase of temperature. Thus, a counter such as a Geiger-Müller counter or the high efficiency counters of the patents of Hare and myself heretofore referred to, when properly constructed, may operate satisfactorily when a voltage of say 1000 volts is impressed upon it and the counter is at ordinary room temperature, say about 70° F. It can be raised in temperature to some extent and still operate reasonably satisfactorily at 1000 volts. However, the voltages constituting the limits of the range or plateau within which the counter may be properly operated, rise as the temperature rises. Thus, if the operating voltage is at an intermediate point on the plateau, some temperature rise may be encountered before it is below the minimum voltage for proper operation. In order that the counter may be properly operated at the higher temperatures encountered in oil wells, I have found that the voltage impressed upon the counter should be increased with increase in temperature and have devised means whereby this may be automatically effected. Thus I have found that with a high efficiency detector such as those above referred to, for which the operating voltage of the detector is about 1000 volts at 70° F., it should be raised to about 1050 volts when the temperature rises to about 212° F. The specific figures given are illustrative and both the proper operating voltages and the amount of voltage increase for the increase in temperature specified may vary with different detectors. The figures given are those found in connection with the operation of a detector such as that described in the patent of Hare, No. 2,397,071, above referred to.

In carrying out the present invention, I provide within the logging instrument containing the radiation detector, a source of direct current voltage at a higher potential than that which is to be impressed upon the detector and take from this source a reduced voltage for application to the detector, this reduced voltage being automatically varied with variations in temperature encountered by the instrument. By way of illustration suitable means for carrying out the present invention are shown in the accompanying drawings, in which Fig. 1 illustrates diagrammatically an instrument embodying means for carrying out the present invention, shown in a cased bore-hole;

Fig. 2 illustrates in part diagrammatically, partly in perspective, an alternative arrangement for securing the proper variation in the voltage to be applied to the counter with variations in temperature; and Fig. 3 represents diagrammatically a portion of the circuits employed in connection with the arrangement of Fig. 2.

Referring to Fig. 1, a fragmentary part of a bore-hole is shown, in which the numeral 5 designates a portion of the formation surrounding a bore-hole and 6 the casing. The numeral 7 designates the housing of the logging instrument, which is suspended by a cable 8 from the surface. This cable may suitably be of the shielded single conductor type, the internal conductor being designated by the numeral 9, and the shield, which may serve as a return conductor or may be grounded, being designated by the numeral 10. The instrument housing 7 may be raised or lowered in the well for logging purposes by cable 8, by means of suitable appliances at the surface (not shown) with provision for measuring and recording the length of cable in the well and thereby the depth of the instrument in the well. As is customary, a source of current (not shown) is also provided at the surface, and supplies to the cable the necessary current, for example, a low-frequency alternating current or direct current, for operating the instruments in the well. Likewise, means are provided at the surface for the necessary amplification and recording of signals derived from the radiation detector in the well, preferably in correlation with the recordings of the depth of the instrument. These, which may be of types known in the art, are not illustrated.

The current from the power source at the surface, which may be an alternating current, for example, is applied to the cable conductor 9, the shield 10 serving as a return or ground. The housing is so attached to the cable that there is an electrical connection between it and the cable shield 10, so that the wall of the housing may be conveniently used as a return or ground for the electrical instruments within the housing, which are diagrammatically illustrated.

Within the housing, a conductor 11 takes current from the cable conductor 9 and is connected to a suitable filter 12, which permits passage of the power current supplied to the instrument, for example a 220 volt, 60 cycle current, but blocks the passage of the signals derived from the detector or counter. From the filter the power current is supplied through conductor 14 to a power pack 15, in which provision is made for transforming and rectifying the current to secure the desired voltages of direct current for operation of the detector and the amplifiers within the instrument housing. A connection 16 is provided from the power pack to the housing of the instrument for the grounding or return of the power current and a suitable connection 17 is provided from the power pack to the instrument housing as the ground connection for the rectified currents produced within the power pack.

The numeral 18 designates the radiation detector, which is shown schematically by a representation of a counter having a central anode wire surrounded by a cylindrical cathode 20. The counter is completely closed and filled with a suitable gas or mixture of gases at low or subatmospheric pressure, as is known in the art. While a counter of conventional type is shown for the purposes of illustration, I prefer to employ a high efficiency counter of the types described in the aforementioned Patents Nos. 2,397,073 and 2,397,071. Irrespective of the type of counter employed, it is preferred that it be of the self-quenching type; that is, that it should contain a gas mixture including a small proportion of an organic vapor, such as alcohol, petroleum ether, or the like, to facilitate quenching.

The power pack 15 delivers through the conductor 21 a rectified and preferably, stabilized direct current voltage at a substantially higher potential than that required for proper operation of the detector 18. Thus, with a detector requiring about 1000 volts for proper operation at normal temperatures, the power pack may deliver to the line 21 a direct current voltage of say 1200 volts. These figures are, of course, for purposes of illustration only, although representing conditions actually obtaining in practical operations in some cases.

In order that the proper voltage may be applied to the counter, the necessary positive operating potential is impressed upon its anode 19 through conductors 22 and 22a. Conductor 22 is connected to a voltage divider shown for purposes of illustration as consisting of resistors 23 and 24 connected in series between the conductor 21 and the conductor 25 leading to the housing or ground. While only two resistors 23 and 24 are illustrated, it will be understood that additional resistors may be interposed in the voltage divider, if desired, or either or both of the resistors 23 and 24 may be made up of more than one resistor in series. Conductors 22 and 22a may be directly connected, if desired, or conductor 22 may pass to a preamplifier and quenching circuit 26, which may be of any of the well-known types, which is connected through conductor 22a with the anode of the detector 20.

In accordance with the present invention, the resistors 23 and 24 are made in whole or in part of materials having different temperature coefficients of resistance, so that, with rise in temperature, the resistance of resistor 24 increases more rapidly than that of resistor 23 and thereby, with constant voltage output from the power pack through conductor 21, the voltage applied to the detector through line 22 will be increased automatically with rise in temperature or decreased with a drop in temperature.

The material having a low temperature coefficient of resistance, of which the resistor 23 may be made in whole or in part, may be any of the known resistance materials having low temperature coefficients of resistance (in which term I include materials having negative temperature coefficients of resistance), say of 0.0004, or lower, such as constantan, maganin, nichrome, graphite, or the like; and the material having a high temperature coefficient of resistance, of which the resistor 24 may be made in whole or in part, may be of any of the known resistance materials, suitably having a temperature coefficient of resistance of 0.003 or higher, such as copper, nickel, iron, silver, phosphor bronze, or the like. The temperature coefficients of various resistance materials suitable for use are well-known; see, for example, Radio Engineers' Handbook by Terman, New York, 1943, page 27.

For example, under the specific conditions hereinbefore referred to for purposes of illustration under normal atmospheric temperature, say about 20° C., a proper operating voltage for the counter would be 1000 volts. With the direct current supplied through the line 21 at a voltage of 1200, resistors 23 and 24 would be in a ratio of 1:5. If now the instrument is brought into a region within the bore-hole in which the temperature is 100° C., the proper operating voltage for the counter rises to about 1050 volts and in order to secure this voltage, the ratio of the resistances of resistors 23 and 24 would be 1:7. By using for the resistor 23 a material of practically zero coefficient of resistance, such as constantan, and by using nickel as the material for the resistor 24, the proper shift in voltage will be secured; and a sufficiently accurate approximation can be secured by using other materials, such as copper, silver, or phosphor bronze for the resistance 24, or by using iron for a portion of that resistance, particularly if materials having negative coefficients of resistance, such as ohmax or carbon are employed in part or in whole for the resistance 23. As is readily apparent, there are a great number of variations which may be made with the knowledge of those skilled in the art. The total value or sum of the resistances of resistors 23 and 24 may vary widely and for practical purposes should be high enough to avoid excessive current drain on the high voltage supply. Thus the total resistance of resistors 23 and 24 may suitably be in the range from 0.25 to 1 megohm.

Since the resistors 23 and 24 are contained within the same instrument housing as the detector, they are subject to the same variations in temperature resulting from environmental changes and immediately and automatically compensate therefor.

The operating voltage for the detector, taken off through the conductor 22, is impressed upon the anode 19 of the detector, the cathode 20 being connected to the housing 7 of the instrument, or in effect grounded, through the line 23. In use, ionizing particles resulting from the action of the radiations from the surrounding formations, such as gamma rays, either natural or induced, cause current pulses, which are transmitted through the conductor 22a to a quenching and amplifying circuit 26.

The quenching and amplifying circuit 26 is not shown in detail, as it may be any suitable known quenching and amplifying circuits, preferably one yielding pulses of equalized amplitude, such as the circuits illustrated in Strong, Procedures in Experimental Physics, New York, 1944, pages 283 and 284. It is preferred, however, to employ the circuit shown in the application of Hare, Ser. No. 581,647, filed March 8, 1945 or that of the application of Lord, Ser. No. 587,504, filed April 10, 1945 now U. S. Letters Patent No. 2,419,-496, granted April 22, 1947. The necessary operating currents for the quenching and amplifying tubes are derived from the power pack 15, as through the connectors 27 and 28, and the connector 29 designates the connection for the quenching and amplifying circuit to the instrument housing or to ground.

The amplified pulses constituting the output of the quenching and amplifying circuit 26 pass through connector 31 to the transformer 32, through which the coupling to the conductor 9 of the cable 8 is effected, and the pulses impressed thereupon.

As is readily apparent from the foregoing description, as the instrument housing moves through the bore-hole and encounters various temperatures, any variation in temperature will result in a corresponding variation in the voltage applied to the anode of the detector or counter. While the invention has been illustrated in connection with a counter in which a rise in temperature of from about 70° F. to about 212° F. will require a change in operating voltage for most effective result of from 1000 volts to 1050 volts, the appropriate operating voltage and variation of temperature will depend upon the specific construction of the detector. These characteristics can be readily determined by suitable tests of the detector prior to use and the resistances employed may be calculated accordingly.

Figs. 2 and 3 illustrate an alternative arrangement by which the variable voltage required in accordance with the present invention may be secured. In these figures, numeral 21' designates the connection to the high voltage source corresponding to conductor 21 of Fig. 1; 22' designates the connection to the anode of the detector or to the quenching circuit 26, corresponding to conductor 22 of Fig. 1, and resistor 23' corresponds to a portion of the resistor 23 of Fig. 1. To secure the desired variation in resistance ratios, a potentiometer is employed, the resistance ratio being changed by movement of the tap on the potentiometer by means of a temperature-responsive element, such as a bi-metallic spring or coil, such constructions being known in the art. As shown in Figs. 2 and 3, the stationary potentiometer disk 45 of suitable insulating material carries a resistor 46, one terminal 47 thereof being connected through conductor 48 to resistor 23'. The other terminal 49 of resistor 46 is connected through conductor 50 to resistor 24', which corresponds to part of resistor 24 of Fig. 1. Resistor 24' is grounded to the instrument housing in the same manner as is resistance 24 of Fig. 1.

A tap or contact spring 51, which contacts the resistor 46, is mounted on a rotatable shaft 52, which passes through the potentiometer disk 45 and may be rotated relative thereto by the bi-metallic coil 53, one end of which is secured to shaft 52 and the other end to a pin 54 secured to disk 45. Changes in temperature cause the bi-metallic coil to rotate the shaft 51 and with it, the tap 51 or resistor 46. The tap 51 is connected through conductor 22' to the detector anode.

In the alternative form illustrated in Figs. 2 and 3, the resistors 23' and 24' may be made of materials of the same temperature coefficients of resistance. The potentiometer is operated through the temperature responsive spring 53 so that the ratio of the resistances in the circuit changes with increase in temperature in the desired proportion to secure the required change in voltage delivered to the detector through conductor 22'.

If desired, a source of radiation such as gamma rays, fast neutrons, or the like, properly shielded from the detector 18, may be included in the instrument housing with it, or may be associated therewith, and the radiations detected by the detector may result from or be induced by the radiations from such source. Thus the invention may be employed in logging gamma ray radiation from strata as influenced by bombardment by neutrons or other penetrating radiations, or in logging induced neutron radiation, with proper modification of the detector, as known in the art. The invention may be employed in other situations in which a radiation detector may be required to operate under varying temperature conditions; for example, in connection with the use of the thickness measuring device of Hare, Reissue Patent No. 22,531, of August 22, 1944.

Although the invention has been illustrated in connection with certain embodiments thereof, it is not to be limited thereto, except in so far as such limitations are included in the accompanying claims.

What I claim is:

1. The method of detecting radiation wherein an instrument capable of detecting radiations encounters regions of varying temperature which comprises impressing a direct current potential on an electrode of a radiation detector of the counter type to yield current pulses, as a result of radiations, and varying the potential impressed on the electrodes of said detector directly as a function of the temperature encountered by said detector, thereby maintaining the detector in effective operating condition.

2. The method of geophysical exploration wherein an instrument capable of detecting radioactivity traverses regions of varying temperature which comprises passing a radiation detector of the counter type through zones in which varying temperatures are encountered, providing a direct current potential higher than that to be impressed across the electrodes of the detector, reducing the direct current potential supplied and impressing the reduced potential upon an electrode of the detector, and varying the extent of reduction of the direct current potential between the source and the detector to cause the potential impressed upon the electrodes of the detector to vary directly as a function of the temperature, thereby maintaining the detector in effective operating condition.

3. In apparatus for radioactivity well-logging, an instrument housing containing a detector of radioactivity of the counter type, a voltage divider and means for supplying a high direct current potential thereto, said voltage divider including in series a resistor of a material having a low temperature coefficient of resistance and a resistor having a high temperature coefficient of resistance, and a tap on said voltage divider between said resistors, said tap being connected to an electrode of said detector, whereby the ratio of the resistances of said resistors varies with changes in temperature and thereby varying the potential applied to the detector electrode to maintain effective operating conditions of the detector at varying temperatures.

4. In apparatus for detecting and measuring radiation, a radiation detector of the counter type, a voltage divider having a plurality of resistors in series associated with said detector and subjected to substantially the same temperature conditions, one of said resistors being of a material having a low temperature coefficient of resistance and another having a high temperature coefficient of resistance, and a tap on said voltage divider between said resistors of low and high temperature coefficients of resistance, said tap being connected to an electrode of said detector, whereby the ratio of the resistances of said resistors varies with changes in temperature, thereby varying the potential applied to the detector electrode to maintain effective operating conditions of the detector at varying temperatures.

GERHARD HERZOG.

REFERENCES CITED

The following references are of record in the file of this patent:

UNITED STATES PATENTS

| Number | Name | Date |
| --- | --- | --- |
| 2,167,630 | Bazzoni | Aug. 1, 1939 |
| 2,330,394 | Stuart | Sept. 28, 1943 |
| 2,369,550 | Frosch | Feb. 13, 1945 |
| 2,392,357 | Bays | Jan. 8, 1946 |
| 2,411,843 | Aiken | Dec. 3, 1946 |